United States Patent

Zentgraf

[11] Patent Number: 6,055,966
[45] Date of Patent: May 2, 2000

[54] INTAKE DEVICE FOR A SUPERCHARGED ENGINE WHICH CAN BE INSTALLED IN THE REAR OF A MOTOR VEHICLE

[75] Inventor: Matthias Zentgraf, Kronberg, Germany

[73] Assignee: VDO Adolf Schindling AG, Frankfurt, Germany

[21] Appl. No.: 08/773,159

[22] Filed: Dec. 26, 1996

[30] Foreign Application Priority Data

Mar. 3, 1995 [DE] Germany ............................ 195 07 361
Feb. 9, 1996 [DE] Germany ............................ 196 04 738

[51] Int. Cl.[7] .................................................. F02B 29/04
[52] U.S. Cl. ........................ 123/563; 123/198 E; 165/119
[58] Field of Search ................................ 123/198 E, 540,
123/542, 563; 60/599; 165/119

[56] References Cited

U.S. PATENT DOCUMENTS 4,204,848  5/1980  Schulmeister et al. .................. 123/563
4,664,074  5/1987  Otani et al. ............................. 123/563

FOREIGN PATENT DOCUMENTS 4202077  7/1993  Germany .
61-38121  2/1986  Japan ...................................... 123/563

OTHER PUBLICATIONS

The Porsche 959—Group B—a Very Special Automobile—Part 1 German Zeitschrift ATZ (Automobiltechnische Zeitschrift) 88 (1986) pp. 265 to 270, Manfred Bantle and Helmut Bott.

*Primary Examiner*—Michael Koczo
*Attorney, Agent, or Firm*—Martin A. Farber

[57] ABSTRACT

An intake device for a supercharged internal combustion engine is installed in a motor vehicle. In particular, the engine is a supercharged otto engine which can be installed in the rear of a motor vehicle, and has an air filter box which receives an air filter element, and a supercharger air cooler. The supercharger air cooler is integrated in the air filter box. In this way, optimal cooling of the supercharger air is assured even in the event that the otto engine and its supercharger as well as the supercharger air cooler are installed in the rear of the vehicle. Furthermore, in this way, the mounting, logistic, and test expenses, particularly at the manufacturing site, can be minimized.

12 Claims, 3 Drawing Sheets

INTAKE DEVICE FOR A SUPERCHARGED ENGINE WHICH CAN BE INSTALLED IN THE REAR OF A MOTOR VEHICLE

FIELD AND BACKGROUND OF THE INVENTION

The present invention relates to an intake device for a supercharged internal combustion engine which can be installed in a motor vehicle, the intake device having an air filter box to receive an air filter element, as well as a supercharger air cooler.

In a motor vehicle known from the German magazine, ATZ, Automobiltechnische Zeitschrift, 88 (1986), pages 265 to 270, the raw air is drawn in directly in the region of the rear of the vehicle. The air flows through an air filter as well as a supercharger which is developed, for instance, as an exhaust turbo-supercharger, and is then fed to the combustion chambers of the engine. The supercharger air cooling in the case of a supercharged internal combustion engine arranged in the rear region of vehicles is problematic since, when a supercharger air cooler is arranged in the rear region, it cannot be provided with sufficient cooling air. In this case, there is involved essentially air which flows around the vehicle under way.

Arrangement of the supercharger air cooler in the front region would lead to favorable flow conditions of the supercharger air cooler, but this is not practical in the case of a rear engine due to the long length of line, which means a large expense and large flow losses.

The same applies also, for instance, in the case of trucks or utility vehicles in which the supercharger air cooler is arranged in a region in which favorable outflow conditions are not present (for instance, behind the driver's cab in trucks).

SUMMARY OF THE INVENTION

It is an object of the present invention to develop an intake device of a supercharged internal combustion engine having supercharger air cooling such that, with the internal combustion engine as well as its supercharger and supercharger air cooler arranged in the rear of the vehicle, or in case of unfavorable conditions of the approach of air to the supercharger air cooler, optimal cooling of the supercharger air is assured. Furthermore, the mounting, logistics and test expenses in connection with the intake device, particularly at the manufacturer's, are to be minimal.

According to the invention, the supercharger air cooler (7) is integrated in the air filter box (5).

The integrating of the supercharger air cooler in the air filter box makes it possible to develop the air supercharger cooler and air filter box as a mounting unit and/or installation unit. In this way, the mounting, logistic and testing expenses at the manufacturer's can be kept low. Structural details of the supercharger air cooler can be taken into account directly in the design of the air filter.

In accordance with one particular feature of the invention, the air filter box (5) has two inlets (22, 23), one inlet (23) being the raw-air inlet for the air flowing through the filter element (6) and the supercharger (11), and the other inlet (22) forming the cooling air inlet for the supercharger air cooler (7). The expression "cooling air inlet" or the expression "cooling air" is therefore used below in order better to express the idea that there is considered here the air mass flow which flows through the supercharger air cooler, although in this case there is obviously concerned also raw air.

The above development of the air filter box means that separate streams of air are conducted through the air filter box. Thus, there is a stream of air for the cooling of the supercharger air cooler. Another stream of air is conducted via the air filter, and the supercharger, which is developed in particular as an exhaust turbo-supercharger, and the supercharger air cooler, to the combustion chambers of the internal combustion engine. The two inlets (22, 23) are advantageously integrated in an intake connection (8) which has a cooling air channel (25) associated with the cooling air inlet (22) and a raw air channel (26) associated with the raw air inlet (23). The advantage of this development is that the stream of raw air required for the combustion is drawn into the suction connection, due to the drawing-in thereof upon the operation of the internal combustion engine, and thus also causes a positive feeding of a part of this drawn-in air, namely of the stream of cooling air, to the supercharger air cooler.

Further according to a feature of the invention, the air filter box (5), the supercharger air cooler (7) and the intake connection (8) form a unitary mounting unit.

Furthermore, by a feature of the invention, air guidance conduits (9, 10, 12) and/or division devices (21) are provided, arranged in the air filter box (5), for the raw air or cooling air flowing through the air filter box (5).

Still further with the invention, there is a feature wherein the air guidance conduits (9, 10, 12) and/or air division devices (21) are integrated in the unitary mounting unit.

In accordance with preferred developments of the present invention, a plurality of suitable engine-specific components are integrated in the air-filter box. This is advantageous from the aspect of further minimizing the mounting, logistic and test expenses and, furthermore, from the standpoint that certain parts which are subject to heating in operation can be cooled by the stream of air flowing through the air filter box. Thus, an air mass measuring element (29) and/or a module (27) for the control electronics of the internal combustion engine and/or a control element (28) for an automatic transmission can be arranged in the air filter box (5).

In order to conduct the raw air or cooling air in a well-defined manner within the air filter box, the box should be provided with air guidance conduits and/or air division devices. Not only the air filter box and the supercharger air cooler, but also the intake connection and the air guidance conduits and/or air division devices, advisedly form a unitary mounting unit.

Since the supercharger air cooler together with its cooling air outlet is arranged at an aerodynamically unfavorable place, namely for instance in a region not acted on by the steam of air under way, and in a region of the rear of the vehicle, a further development of the invention provides that, in the direction of flow through the supercharger air cooler (7), in front of or behind same, a blower fan or suction fan (24) is installed in the air filter box (5) or attached to it. The fan blows or draws the cooling air out of the supercharger air cooler.

The invention thus proposes a supercharger air cooler which is integrated in the air filter in order to minimize the mounting, logistics and test expenses, particularly for the manufacturer. The stream of raw air is used, for instance, in part to flow around the cooling fins of the supercharger air cooler. The air guidance conduits and air division devices arranged in the air filer box can be produced substantially without effect on the price upon integration of the box which is made of plastic. Furthermore, a suction and/or blower fan can be integrated at a favorable price into the intake device.

The development in accordance with the invention can be used in otto or diesel engines as well as in so-called hybrid drives (for instance joint use of an internal combustion engine and of an electric motor) without being limited to this.

According to a feature of the invention, the air filter box (5) is fastened to a transmission (4) which cooperates with the internal combustion engine.

Further by the invention, the internal combustion engine is arranged in the rear of the motor vehicle.

Another feature of the invention is that the internal combustion engine is an otto engine or a diesel engine.

Still further according to the invention, the internal combustion engine is part of a hybrid drive of the motor vehicle.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
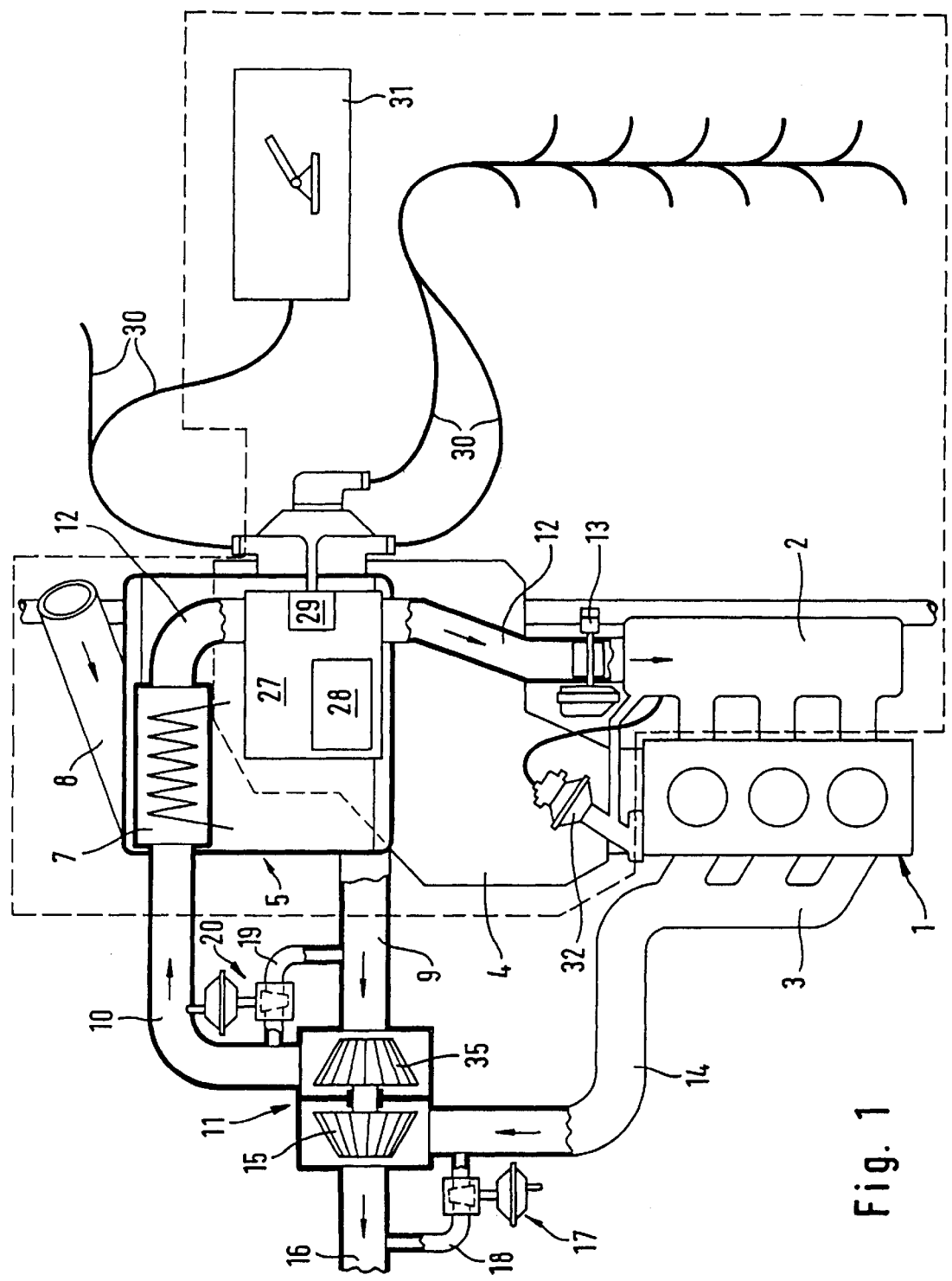
FIG. 1 shows diagrammatically an arrangement of the intake device of the invention in connection with a supercharged otto engine, as well as a periphery of the otto engine.

A four-cycle otto engine 1 having three cylinders has an intake manifold 2 and an exhaust manifold 3. on the engine 1 there is flanged a transmission 4 driven by the engine 3 for driving a drive shaft (not shown). On the transmission 4 there is fastened an air filter box 5 which is developed in accordance with the invention, and is described in further detail below. The filter box 5 receives a filter element, in the nature of a round filter cartridge, designated 6 in FIGS. 2 and 3.

Within the air filter box 5 there is a supercharger air cooler 7. An intake connection 8 is connected to the air filter box 5. Raw air flows from the outside into the intake connection 8 and from there, in a partial stream, as cooling air through the fins (not shown) of the supercharger air cooler to the outside, and in another partial stream through the filter element 6. This stream of raw air passes from there via a line 9 to the compressor wheel 35 of an exhaust turbo-supercharger 11. The compressed raw air passes through a line 10 to the supercharger air cooler 7, is cooled there, and then fed via another line 12 to the intake manifold 2. A throttle-valve adjustment member 13 is integrated in the line 12 shortly in front of the intake manifold 2. The air passes from the intake manifold 2 into the combustion chambers of the engine 1. After combustion, the exhaust gas is expelled into the exhaust manifold 3 and passes through a line 14 to the exhaust gas turbo-supercharger 11, the exhaust gas driving the turbine wheel 15 of the exhaust gas turbo-supercharger 11.

The action of the raw air and the exhaust gas on the exhaust gas turbo supercharger 11 can be controlled by means of two by-passes. For this purpose, the lines 9 and 10 on the compressor-wheel side are connected directly with a connecting line 19 with which there is associated a setting valve 20. Similarly the lines 14 and 15 on the turbine-wheel side are connected by a connecting line 18 with which a setting valve 17 is associated.

For a better understanding of the present invention, FIGS. 2 and 3 will be described below. FIG. 3, in particular, shows that the air filter box 5 and the intake connection 8 form a structural unit, an air separating device in the form of a partition wall 21 dividing the air entering into the air filter box 5 from the outside into two streams of air, one of which, the stream of raw air flowing to the combustion is indicated by solid arrows, while the stream of cooling air which effects the cooling of the stream of raw air and flows through the fins of the supercharger air cooler 7 is shown in dashed arrows. The air filter box 5 thus has two inlets 22 and 23, the stream of cooling air from the inlet 22 flowing between the partition wall 21 and the associated wall of the air filter box 5 through the supercharger air cooler and being given off from there to the atmosphere.

Due to the fact that the engine 1 and its peripheral equipment, and thus also the supercharger air cooler 7 are arranged in the rear of the vehicle, a suction fan 24 is provided behind the supercharger air cooler in the embodiment shown, the fan 24 assisting in the removal of the cooling air to the environment by suction. The fan 24 is integrated in the air filter box 5. While the cooling air flows through the channel 25 formed in the air filter box 5, the raw air flows through a further channel 26 in the air filter box which is formed by the partition wall 21 and another surrounding wall section of the air filter box 5. The stream of raw air indicated by the solid thin arrows passes from the outside into the cylindrical filter element 6, and passes from the inside thereof into the line 9 and then to the compressor wheel 35 of the turbo supercharger 11. Thereupon, the air passes into the line 10 to the supercharger air cooler 7, and from the latter through the line 12 to the otto engine 1.

Figure 2:
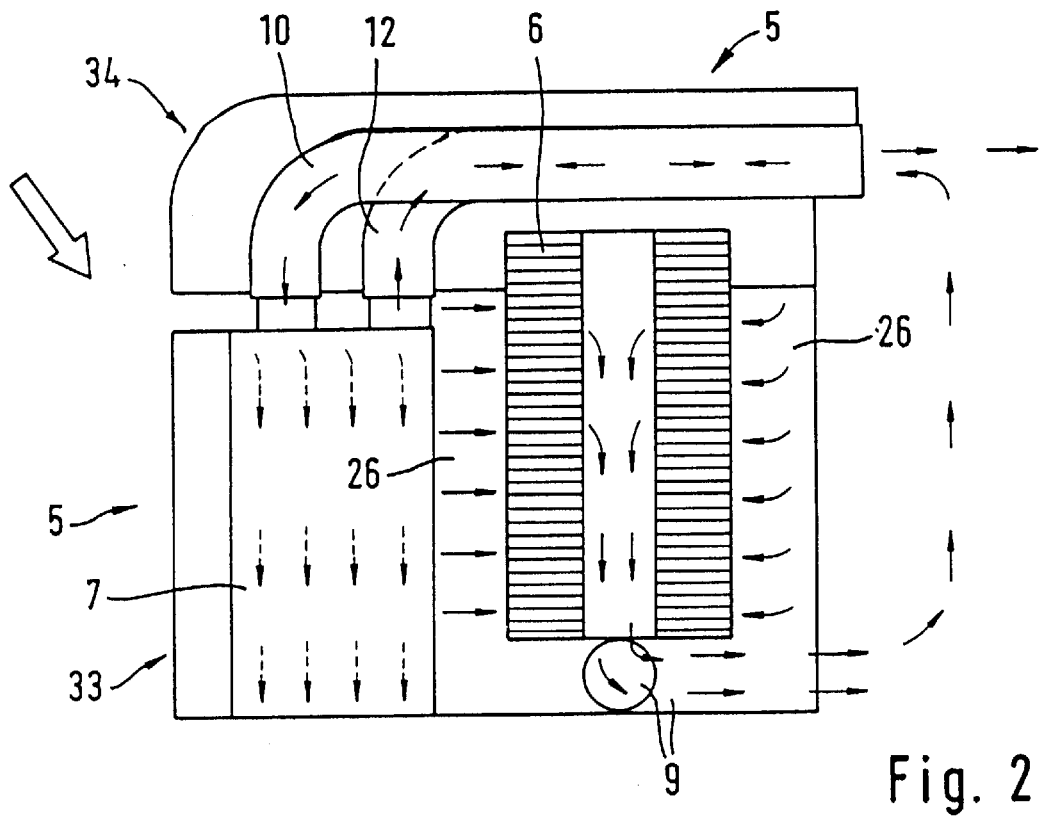
FIG. 2 is a basic diagrammatic view of the intake device with supercharger air cooler integrated in the air filter box, seen from the side.
Figure 3:
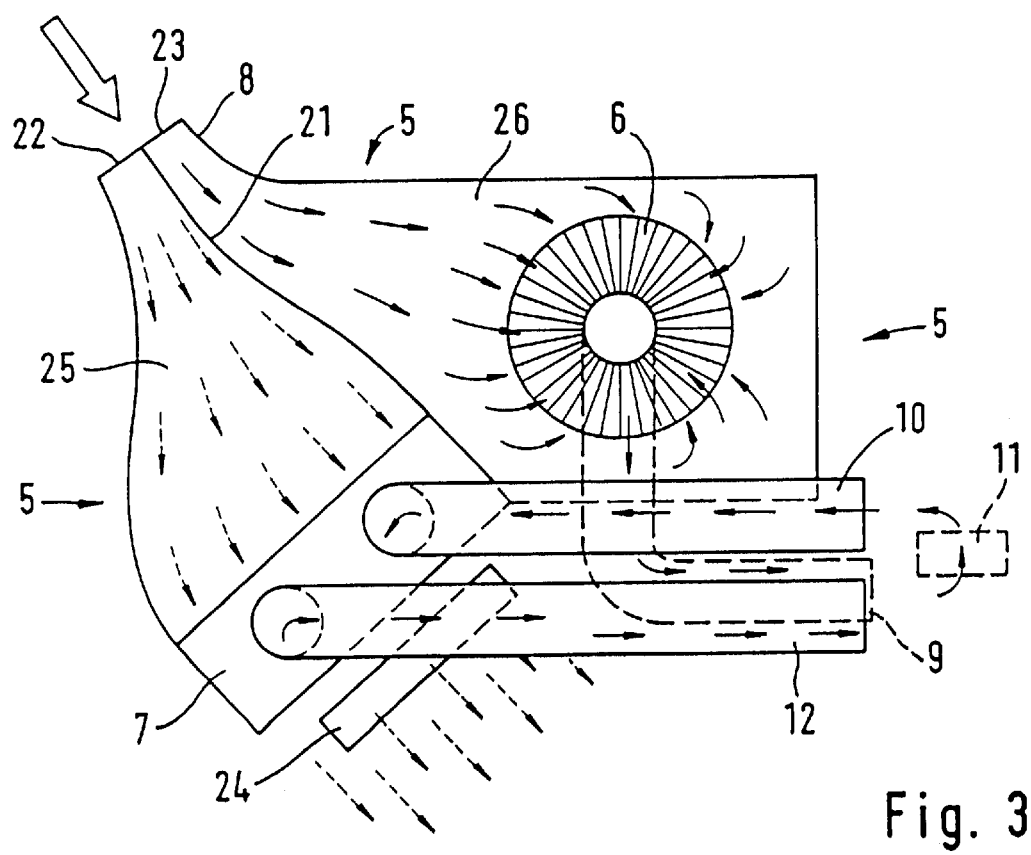
FIG. 3 is a diagrammatic view of the suction device of FIG. 2, seen from above.
Figure 4:
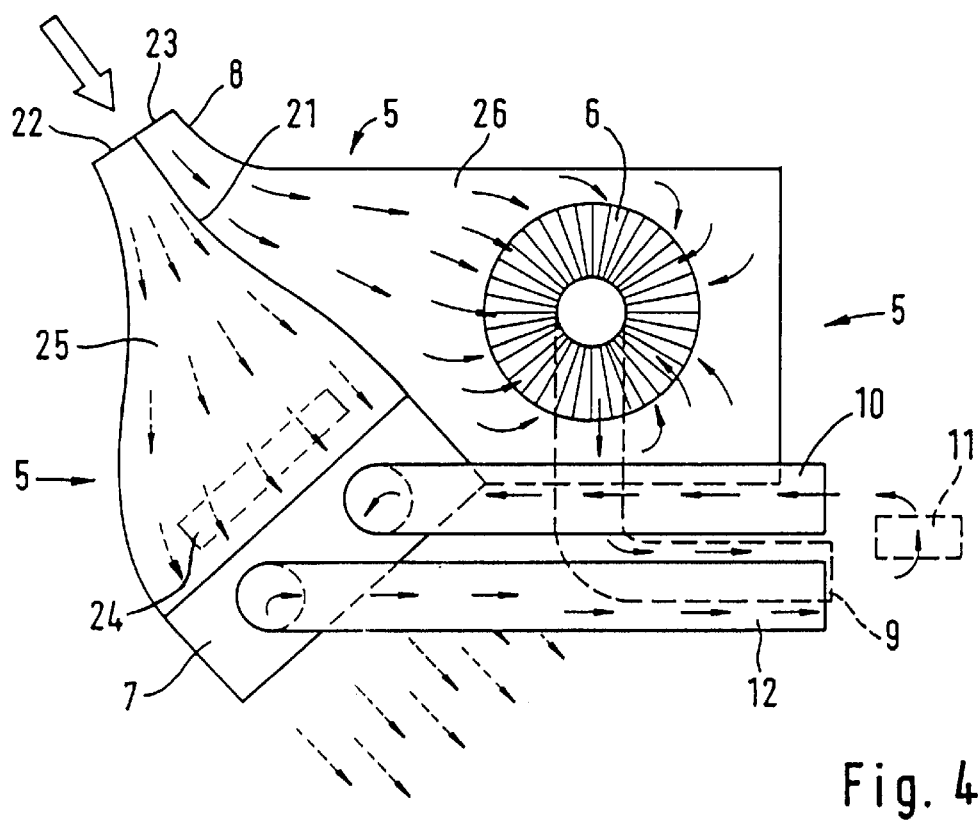
FIG. 4 is a view similar to FIG. 3 but showing the fan located within the filter box upstream of the supercharger air cooler.

These conditions of flow are presented also in the side view of FIG. 2, which shows how the air emerges from the air cooler 7, and furthermore how the raw air enters the channel 26 in the region of the connection 8. The passage of air to the air cooler 7 is covered in FIG. 2 and, hence, is not visible. The solid arrow shown in FIG. 2 indicates the approximate place of the entrance of the raw air into the air filter box 5. FIG. 2 shows that the air filter box 5 consists of a box lower part 33 and a box cover 34. In the region in which the lines 9 and 10 extend within the air filter box 5 they are integrated in the box cover 34.

In accordance with an important further development of the invention, additional control elements, as already indicated above, may be integrated into the air filter box 5. the elements heat up in operation, they are arranged within the channel 25 through which the cooling air flows.

As can be noted in general from FIG. 1, a module 27 for engine control electronics, a control device 28 for an automatic transmission, and an air mass measuring element 29 be integrated, for instance, in the air filter box 5. The connecting lines to the said elements and to the device 27 to 29 are indicated by the reference numeral 30, one line 30 concerning for instance an electronic gas pedal 31. 32 is an exhaust gas return valve which can also be controlled via the module 27.

I claim:

1. An intake device for a supercharged internal combustion engine which is installable in a motor vehicle, the intake device comprising:

an air filter box which receives an air filter element, and a supercharger air cooler;

wherein the supercharger air cooler is integrated in the air filter box; wherein the air filter box has a first inlet and a second inlet, the first inlet receiving raw air for flowing the air through the filter element and the supercharger, and the second inlet receiving cooling air for the supercharger air cooler; wherein said first inlet and said second inlet are integrated in an intake connection of said filter box; and said filter box has a cooling air channel associated with said second air inlet and a raw air channel associated with said first air inlet.

2. The intake device according to claim 1, wherein said air filter box and said supercharger air cooler and said intake connection constitute a unitary mounting unit.

3. The intake device according to claim 1, further comprising air guidance conduits arranged in said air filter box for passage of the raw and/or cooling air flowing through said air filter box.

4. The intake device according to claim 3, further comprising an air-stream divider constituting a partition wall for dividing the raw air and the cooling air, the air-stream divider being located in said filter box.

5. The intake device according to claim 4, wherein said air guidance conduits and said air-stream divider constitute a unitary mounting unit.

6. An intake device for a supercharged internal combustion engine which is installable in a motor vehicle, the intake device comprising:

an air filter box which receives an air filter element, and a supercharger air cooler;

wherein the supercharger air cooler is integrated in the air filter box;

a fan mounted to said filter box and being located along an air stream flowing through said supercharger air cooler; wherein said fan is a suction fan; and wherein said fan is located within said filter box.

7. The intake device according to claim 6, wherein said fan is located upstream of said supercharger air cooler.

8. The intake device according to claim 6, wherein said fan is located downstream of said supercharger air cooler.

9. An intake device for a supercharged internal combustion engine which is installable in a motor vehicle, the intake device comprising:

an air filter box which receives an air filter element, and a supercharger air cooler;

wherein the supercharger air cooler is integrated in the air filter box; wherein there is a transmission connected to said engine; and said air filter box is fastened to the transmission.

10. The intake device according to claim 9, wherein the internal combustion engine is an otto engine.

11. The intake device according to claim 9, wherein the internal combustion engine is a diesel engine.

12. An intake device for a supercharged internal combustion engine which is installable in a motor vehicle, the intake device comprising:

an air filter box which receives an air filter element, and a supercharger air cooler;

wherein the supercharger air cooler is integrated in the air filter box;

a fan mounted to said filter box and being located along an air stream flowing through said supercharger air cooler; wherein said fan is a blower fan; and wherein said fan is located within said filter box.

* * * * *